(12) United States Patent
Ballurkar et al.

(10) Patent No.: US 7,693,800 B2
(45) Date of Patent: Apr. 6, 2010

(54) METHOD AND SYSTEM FOR METERING MIXED WEIGHT MAIL PIECES AT AN INCREASED AVERAGE RATE

(75) Inventors: Sanju Ballurkar, Naugatuck, CT (US); James E. Burke, Jr., Southington, CT (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 1905 days.

(21) Appl. No.: 10/192,606

(22) Filed: Jul. 9, 2002

(65) Prior Publication Data

US 2004/0010477 A1 Jan. 15, 2004

(51) Int. Cl.
*G06Q 30/00* (2006.01)
*G06F 17/00* (2006.01)
*G07B 17/02* (2006.01)
*G01G 19/413* (2006.01)

(52) U.S. Cl. .............. 705/400; 705/1; 705/406; 705/407; 705/414; 705/415

(58) Field of Classification Search .......... 705/1, 705/407, 408, 414, 415, 400, 401; 702/173; 177/25

See application file for complete search history.

(56) References Cited

U.S. PATENT DOCUMENTS

| 4,351,033 | A | | 9/1982 | Uchimura et al. ............ 364/900 |
|---|---|---|---|---|
| 4,516,209 | A | | 5/1985 | Scribner ..................... 364/466 |
| 4,742,878 | A | | 5/1988 | Freeman et al. ............... 177/25 |
| 4,787,048 | A | | 11/1988 | Freeman et al. ............. 364/466 |
| 4,809,186 | A | * | 2/1989 | Freeman et al. ............. 705/406 |
| 5,119,306 | A | | 6/1992 | Metelits et al. ............. 364/464 |
| 5,172,783 | A | | 12/1992 | Feinland et al. ............. 177/185 |
| 5,178,228 | A | | 1/1993 | Feinland et al. ............. 177/185 |
| 5,226,496 | A | | 7/1993 | Feinland et al. .......... 177/25.15 |
| 5,717,166 | A | | 2/1998 | Talmadge ................ 177/25.13 |

(Continued)

FOREIGN PATENT DOCUMENTS

EP 0782113 A2 * 2/1997

*Primary Examiner*—John W Hayes
*Assistant Examiner*—Fadey S Jabr
(74) *Attorney, Agent, or Firm*—Brian A. Lemm; Angelo N. Chaclas (57) ABSTRACT

A method for printing indicia on mailpieces at an increased average speed. The system includes: a postal scale for determining a postage amount for a mail piece; a printer; and a postage meter responsive to the postal scale to control the printer to print an indicium representative of the postage amount. The postage meter further includes: a programmable controller; a secure mechanism for accounting for postage amounts expended; and an indicia generator. The programmable controller is programmed in accordance with the method of the present invention to: respond to a first signal from the postal scale to generate an indicium representative of the last used amount; and, if the determined postage amount equals the last used amount, respond to a second signal representative of the determined postage amount to print the indicium representative of the last used postage amount; and, if the determined postage amount is not equal to the last used postage amount, respond to the second signal to delete the indicium representative of the last used postage amount; generate an indicium representative of the determined postage amount; and print the indicium representative of the determined postage amount on the mail piece.

10 Claims, 5 Drawing Sheets

U.S. PATENT DOCUMENTS

| | | | |
|---|---|---|---|
| 5,723,825 A | | 3/1998 | Dolan et al. ................ 177/145 |
| 6,004,048 A | * | 12/1999 | Moh et al. .................... 400/70 |
| 2002/0087493 A1 | * | 7/2002 | Herbert ...................... 705/406 |
| 2003/0204477 A1 | * | 10/2003 | McNett ...................... 705/406 |

* cited by examiner

METHOD AND SYSTEM FOR METERING MIXED WEIGHT MAIL PIECES AT AN INCREASED AVERAGE RATE

BACKGROUND OF THE INVENTION

The present invention relates to a system and method for rapid weighing and metering of items. More particularly it relates to postage metering systems used to weigh, determine postage for, and meter (i.e. imprint with a postal indicium representative of the postage determined) mail pieces or the like.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mail piece in order that the throughput of the system can be increased.

U.S. Pat. No. 4,787,048; issued: Nov. 22, 1988, discloses one approach to decreasing the time required for a postage scale system to determine the weight of a mail piece. The system disclosed in this patent takes advantage of the structure of postage rate charts, i.e., the function that relates the weight of the mail piece to the appropriate postage amount. Such rate chart provides a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

While such systems have proven to be highly satisfactory for their intended purpose a basic problem remains that the weight of each mail piece in batches of mixed weight mail must be determined and the corresponding postage amount calculated before the vault (i.e. secure accounting registers which track postage expended by the meter to assure that the postal service receives payment for all mail pieces metered) can be debited for the postage amount and an appropriate indicium generated. Because of the secure nature of the vault and the complexity of modern digitally printed indicia, which typically use encryption to assure that each indicium is uniquely identified with its mail piece to prevent generation of counterfeit indicia, these processes take a significant amount of time; requiring that the transport be longer than otherwise necessary, or be slowed or stopped, to provide dead time to account for postage amounts expended and to ready an indicium for printing.

Thus it is an object of the present invention to provide a method and system for increasing the average time available to generate indicia and account for postage expended without increasing dead time.

BRIEF DESCRIPTION OF THE INVENTION

The above object is achieved and the disadvantages of the prior art are overcome in accordance with the present invention by means of a method and system for printing postal indicia on mail pieces, where the system includes: a postal scale for determining a postage amount for a mail piece as a function of a weight for the mail piece; a printer; and a postage meter responsive to the postal scale to control the printer to print the mail piece with an indicium representative of the postage amount. The postage meter further includes: a programmable controller; a secure mechanism for accounting for postage amounts expended; and an indicia generator. The programmable controller is programmed in accordance with the method of the present invention to: respond to a first signal from the postal scale to control the indicia generator to generate an indicium representative of the last used amount; and, if the determined postage amount equals the last used amount, respond to a second signal representative of the determined postage amount to control the printer to print the indicium representative of the last used postage amount on the mail piece; and, if the determined postage amount is not equal to the minimum postage amount, respond to the second signal to; delete the indicium representative of the last used postage amount; control the indicia generator to generate an indicium representative of the determined postage amount; and to control the printer to print the indicium representative of the determined postage amount on the mail piece.

In accordance with one aspect of the present invention a secure mechanism is debited for am amount corresponding to the printed indicium before that indicium is download to the printer.

In accordance with another aspect of the present invention the first signal is representative of the minimum postage amount.

In accordance with another aspect of the present invention the postal scale includes a transport for transporting and supporting a mail piece to be weighed; a transducer mechanism for providing a weight signal representative of a weight for the mailpiece; a programmable scale controller for responding to the weight signal to determine the postage amount and for controlling transport of the mail piece. The programmable scale controller is programmed in accordance with the method of the present invention to: respond to the presence of the mail piece on the transport to output a first signal representative of a last used postage amount; and thereafter, respond to the weight signal to determine the postage amount and output a second signal representative of the determined postage amount.

Other objects and advantages of the present invention will be apparent to those skilled in the art from consideration of the detailed description set forth below and the attached drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS OF THE INVENTION

Figure 1:
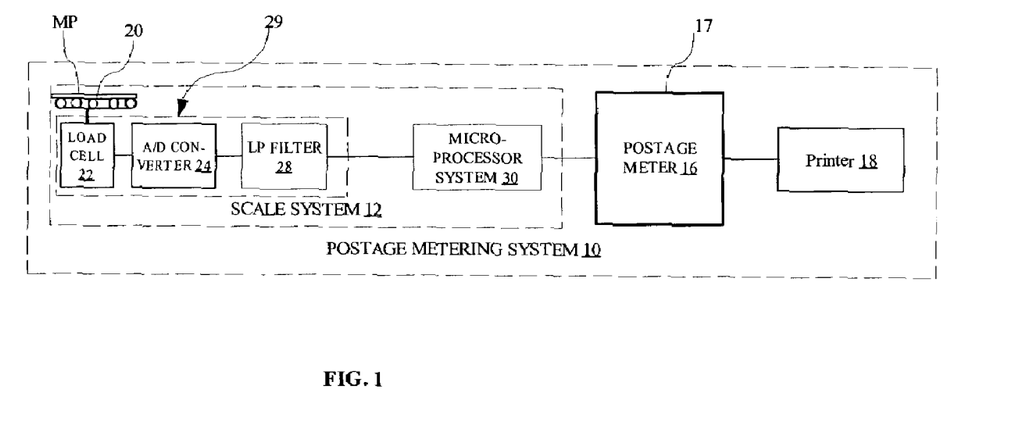
FIG. 1 shows a schematic block diagram of a system in accordance with the present invention for metering of mixed weight mail pieces.

FIG. 1 shows postage metering system 10, which includes scale system 12, postage meter 16 and printer 18. As is well known in the art, meter 16 is enclosed in secure housing 17 to prevent tampering. Scale system 12 includes transport 20, which supports a mail piece during a weighing operation and then transports the mail piece to printer 18 for printing with a postal indicium; load cell 22, which supports transport 20 and which generates an analog output representative of the instantaneous load it supports; analog-to-digital converter 24, which converts the output of load cell 22 to digital form; and low pass digital filter 28, which processes the output of converter 24 to reduce or eliminate the effects of vibrations. Microprocessor system 30 functions as the programmable controller for scale system 12, as will be described further below.

Together load cell 22, converter 24 and filter 28 comprise transducer mechanism 29, which generates a digital weight signal (i.e. a time series of digital values) representative of the instantaneous load supported by cell 22. Other types of transducer mechanisms are known, or may be developed in the future, and details of the operation of particular transducer mechanisms used form no part of the present invention.

Microprocessor system 30 first detects the presence of mail piece MP and sends a first signal S1 to postage meter 16 to initiate generation of an indicium representative of a last used postage amount. In one embodiment of the present invention signal S1 can be representative of the last used amount. Microprocessor 30 can determine the presence of mail piece MP from analysis of the transient response of the weight signal in a well known manner or, in other embodiments scale system can include sensors to signal the presence of mail piece MP. Microprocessor system 30 then receives the weight signal from transducer mechanism 29 and processes it to determine a weight for the mail piece in process. It then accesses postal rate charts (not shown) to determine a postage amount for the mail piece in process as a function of the mail piece weight, and possibly as a function of other mail piece data such as class of service or special services requested for the mail piece. Typically such rate charts will be updated periodically in any convenient manner as postal services change their rates. Microprocessor system 30 then outputs a second signal S2 representative of the postage amount to postage meter 16 and also controls the operation of transport 20 to assure that the arrival of mail piece MP at printer 18 is properly synchronized with the operation of meter 16, as will be described further below.

Except as will be described further below with regard to the present invention, operation of such postage metering systems is well known and need not be described further here for an understanding of the present invention.

Figure 2:
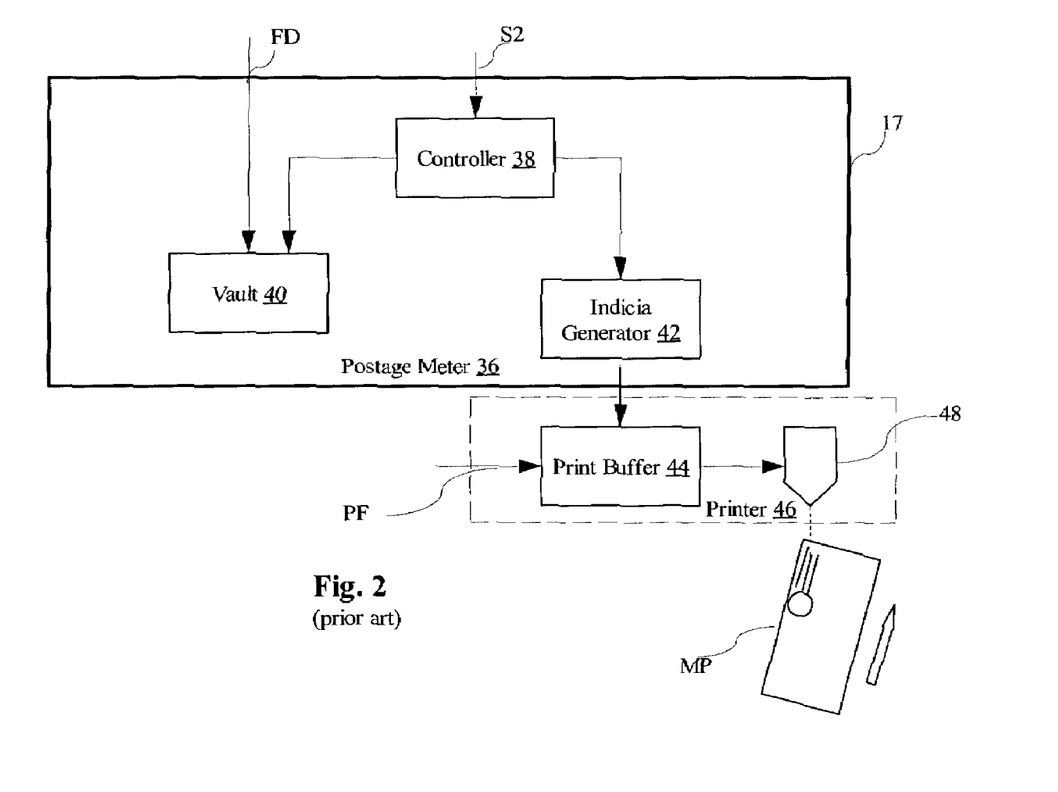
FIG. 2 shows a schematic block diagram of a prior art postage meter.

FIG. 2 shows prior art postage meter 36 which includes controller 38; vault 40, which is a secure accounting mechanism used to track postage amounts expended; and indicia generator 42, which generates a digital indicium to be printed on mail piece MP as proof of payment of postage. Initially, funds data FD representative of prepaid postage is loaded into vault 40 in a secure manner. (Post-payment systems, where the secure accounting system only tracks postage expended and periodic payments to a postal service are made accordingly, are also known.) When signal S2, representative of a postage amount is received, controller 38 debits the postage amount from vault 40 and controls indicia generator 42 to generate an indicium which includes a representation on the postage amount as well as other data such as the date and meter serial number. The indicium is then downloaded to print buffer 44 of printer 18. When mail piece MP is appropriately positioned print fire signal PF causes printer 18 to control printhead 48 to print the indicium stored in buffer 44 onto mail piece MP. It should be noted that, because signal PF is not secure, the postage amount must be considered expended once it is downloaded to buffer 44, even if it is later erased without having been printed.

As noted above, because the acceptance of metered mail by postal services depends on the vault being sufficiently secure so that indicia can only be generated if sufficient funds are available in vault 40 and the proper postage amount has been debited from vault 40; and because the digital indicia are typically encrypted to assure that each indicium is uniquely identified with its mail piece to prevent generation of counterfeit indicia, a significant amount of time is required to carry out these processes; which in turn means that transport of mail piece MP must be delayed after its weight is determined longer than otherwise would be necessary, either by lengthening the transport path, slowing the transport speed, or temporarily slowing or stopping the transport.

Figure 3:
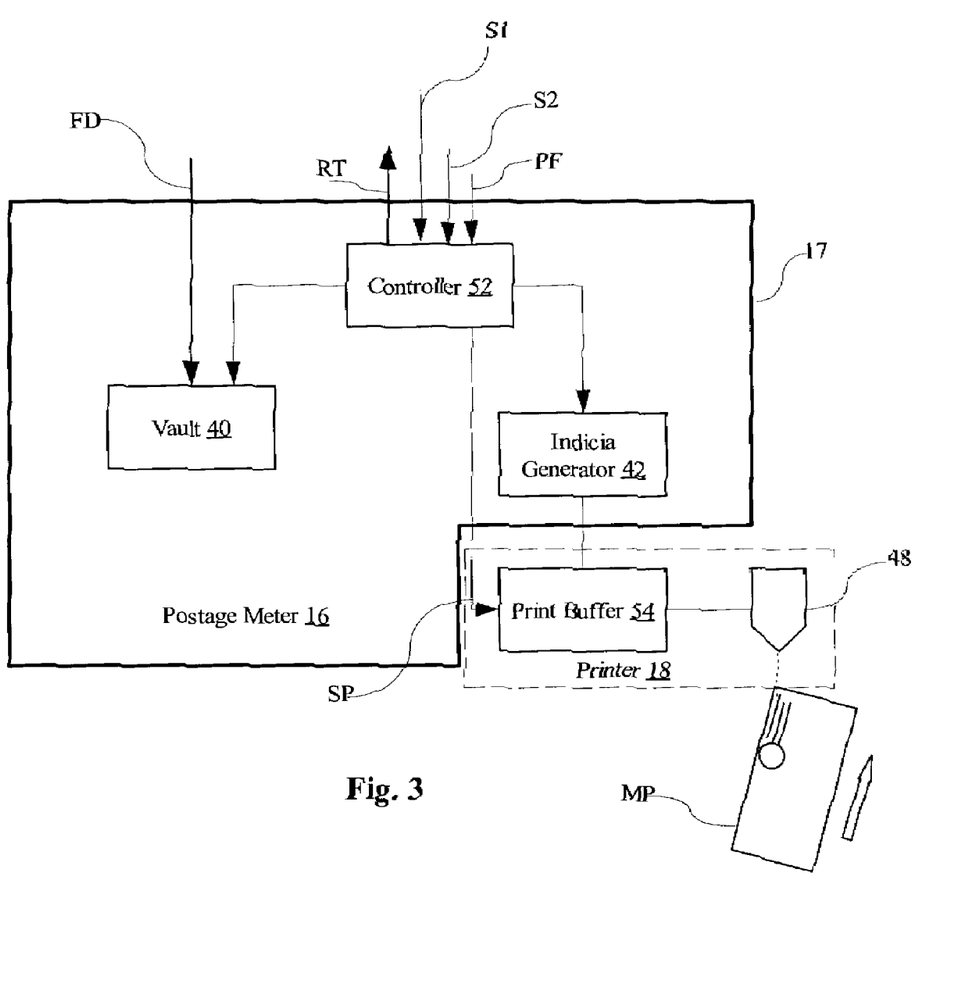
FIG. 3 shows a schematic block diagram of a postage meter in accordance with the present invention.

FIG. 3 shows postage meter 16 in accordance with the present invention. Meter 16 includes controller 52; vault 40; and indicia generator 42. As in prior art meter 36 initially, funds data FD representative of prepaid postage is loaded into vault 40 in a secure manner. In addition to signal S2, representative of a postage amount for mail piece MP, controller 52 receives signal S1, which indicates the presence of mail piece MP on scale system 12 and print fire signal PF. Controller 52 outputs resume transport signal RT to scale system 12, and outputs start print fire signal SP to printer 18.

Figure 4:
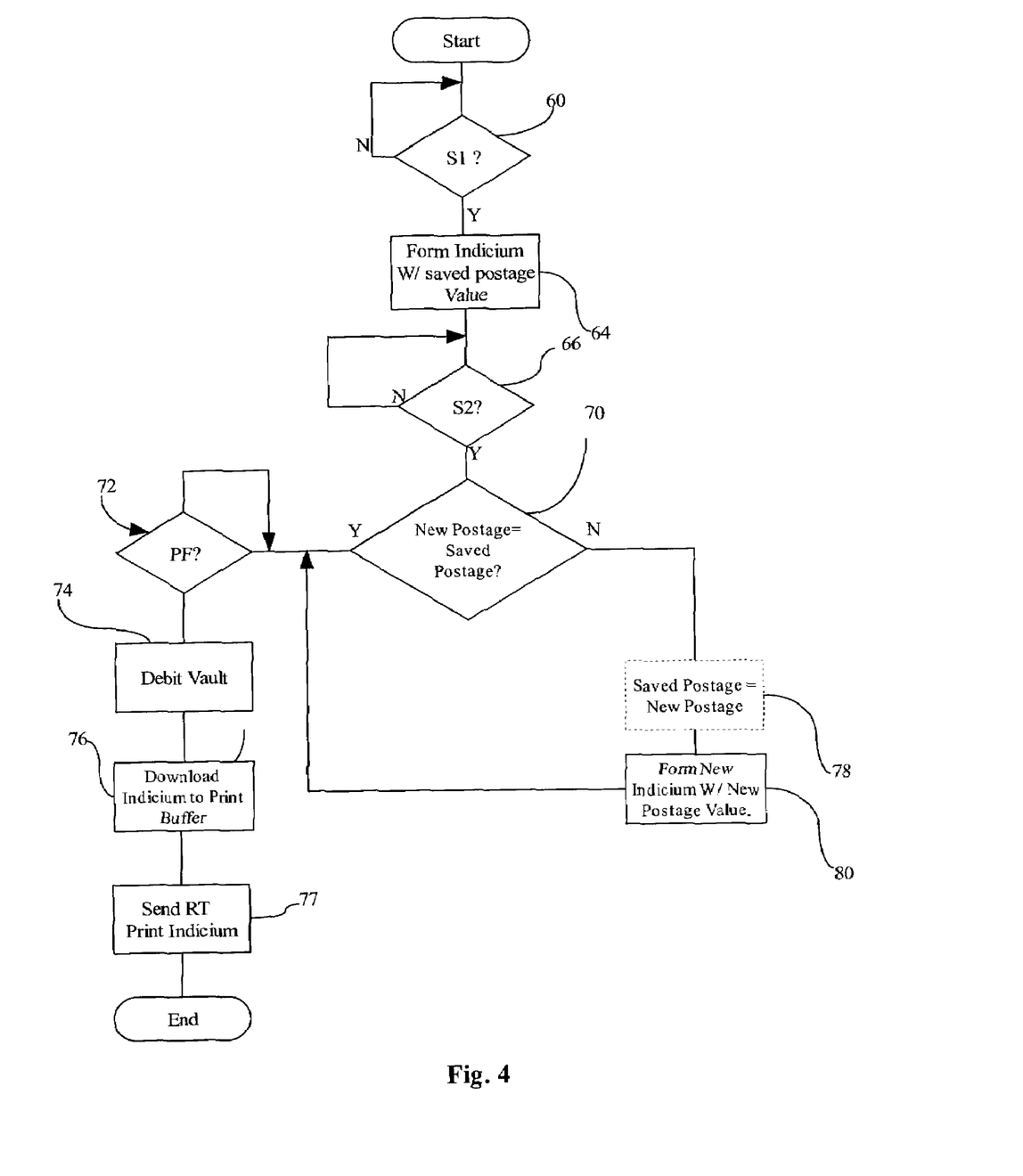
FIG. 4 shows a flow diagram of the operation of the postage meter of FIG. 3 in accordance with the method of the present invention.

FIG. 4 shows a flow diagram of the operation of meter 16 in accordance with the method of the present invention. At step 60 controller 52 waits for signal S1 which indicates the presence of mail piece MP on scale system 12. At step 64 controller 52 controls indicia generator 42 to generate an indicium corresponding to a postage amount last used. In a preferred embodiment shown the postage amount used last is saved by meter 16. In other embodiments the last used postage value is saved by scale system 12 and signal S1 is representative of the last used postage value. At step 66 controller 52 waits for signal S2 to determine the actual postage amount for mail piece MP and at step 70 determines if the new determined postage amount is equal to the saved postage amount.

If so, at step 72 controller 52 determines if print fire signal PF has been received and, if it has, then at step 74 debits vault 40 for an amount corresponding to the indicium to be printed on mail piece MP by printer 18, and otherwise waits. At step 76 controller 52 downloads the indicium to print buffer 54, at step 77 sends signal RT to scale system 12, sends signal SP to printer 18 to start printing, and then exits. As is well known in the art, signal PF can be generated in any convenient manner, such as by a sensor positioned to detect when mail piece MP is properly positioned with respect to printhead 48, or by measuring the time elapsed, or distance traveled by mail piece MP after receipt of signal S2.

Otherwise, if the saved postage value does not equal the new determined postage value, at step 78 controller 52 sets the saved postage amount equal to the new determined postage amount, at step 80 controls generator 42 to generate a new indicium corresponding to the new postage amount, and goes to step 72. (It should be noted that step 78 is not necessary in embodiments of the present invention where signal Si is representative of the saved postage value.)

In other embodiments of the present invention only portions of the new indicium, which are changed, are generated and downloaded. As used herein the term "delete" is intended to include this or any other convenient method for replacing the last used postage indicium with a new indicium.

Figure 5:
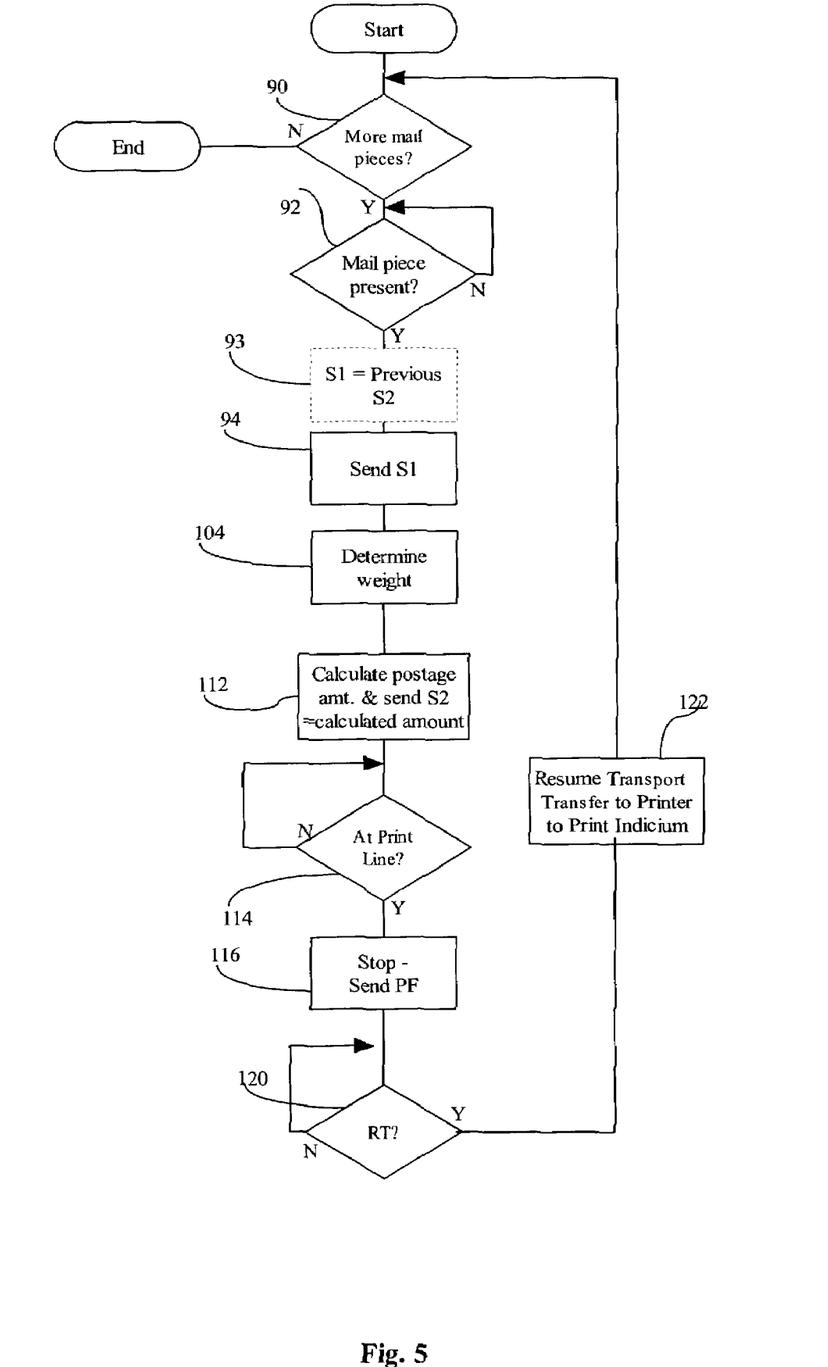
FIG. 5 shows a flow diagram of the operation of the scale system of FIG. 1 in accordance with the method of the present invention.

FIG. 5 shows a flow diagram of the operation of scale system 12 in accordance with the method of the subject invention. At step 90 microprocessor system 30 determines if there are more mail pieces to be processed and, if not, exits and, otherwise, at step 92 waits for the arrival of mailpiece MP on transport 20. When microprocessor system 30 detects arrival of mail piece MP at transport 20, preferably by detection of a transient response of the weight signal in a manner well known to those skilled in the art, at step 93 S1 is set equal to the previous value for S2, i.e. the previous postage amount, and at step 94 it outputs signal S1. (It should be noted that step 93 is not necessary in embodiments of the present invention where the last used postage value is saved by meter 16 and signal Si is not representative of the saved postage value.) Then at step 104 system 30 processes the weight signal to determine weight and postage amount for mail piece MP in any convenient manner. Methods for making accurate determinations of weights and postage amounts are known to those skilled in the art and details of particular methods used form no part of the present invention. At step 112 microprocessor system 30 calculates the postage for mail piece MP and sends signal S2 representative of the calculated postage amount. At step 114 system 30 determines if mail piece MP has reached the print line, i.e. is positioned for printing, and if so at step 116 stops mail piece MP and sends signal PF to meter 16. Then at step 120 system 30 waits for signal RT indicating that postage meter 16 has completed accounting and indicia generation functions for mail piece MP and then goes to step 122 to resume transport and transfer mail piece MP to printer 18 for printing of the indicium.

The embodiments described above and illustrated in the attached drawings have been given by way of example and illustration only. From the teachings of the present application those skilled in the art will readily recognize numerous other embodiments in accordance with the present invention.

What is claimed is:

1. A system for printing digital postal indicia on mail pieces, comprising:
    a) a postal scale for determining a postage amount for a mail piece as a function of a weight for said mail piece;
    b) a printer;
    c) a postage meter responsive to signals from said postal scale to control said printer to print on said mail piece a digital indicium representative of said postage amount, said postage meter comprising:
        c1) a programmable controller;
        c2) a secure mechanism for accounting for postage amounts expended; and
        c3) an indicia generator to generate digital indicia as proof of payment of postage for mail pieces; where
    d) said programmable controller is programmed to:
        d1) respond to a first signal from said postal scale to control said indicia generator to generate a digital indicium representative of a last used postage amount without debiting said secure mechanism for a postage amount corresponding to said digital indicium; then
        d2) if said determined postage amount equals said last used postage amount, respond to a second signal representative of said determined postage amount to debit said secure mechanism for the postage amount corresponding to said digital indicium and control said printer to print said digital indicium representative of said last used postage amount on said mail piece; otherwise
        d3) if said determined postage amount does not equal said last used postage amount, respond to said second signal to delete said digital indicium representative of said last used postage amount; control said indicia generator to generate a new digital indicium representative of said determined postage amount; debit said secure mechanism for a postage amount corresponding to said new digital indicium, and to control said printer to print said new digital indicium representative of said determined postage amount on said mail piece.

2. A system as described in claim 1 where said last used postage amount is saved in said meter.

3. A system as described in claim 1 where said last used postage amount is saved in said postal scale and said first signal is representative of said last used postage amount.

4. A system as described in claim 1 where secure mechanism is debited before said digital indicium or said new digital indicium is downloaded to said printer.

5. A postage meter responsive to a postal scale to control a printer to print a mail piece with an indicium representative of a postage amount, said postage meter comprising:
    a) a programmable controller;
    b) a secure mechanism for accounting for postage amounts expended; and
    c) an indicia generator to generate digital indicia as proof of payment of postage for mail pieces; where
    d) said programmable controller is programmed to:
        d1) respond to a first signal from said postal scale to control said indicia generator to generate a digital indicium representative of a last used postage amount without debiting said secure mechanism for a postage amount corresponding to said digital indicium; then
        d2) if said determined postage amount equals said last used postage amount, respond to a second signal representative of said determined postage amount to debit said secure mechanism for the postage amount corresponding to said digital indicium and control said printer to print said digital indicium representative of said last used postage amount on said mail piece; otherwise
        d3) if said determined postage amount does not equal said last used postage amount, respond to said second signal to delete said digital indicium representative of said last used postage amount; control said indicia generator to generate a new digital indicium representative of said determined postage amount; debit said secure mechanism for a postage amount corresponding to said new digital indicium, and to control said printer to print said new digital indicium representative of said determined postage amount on said mail piece.

6. A postage meter as described in claim 5 where said first signal is representative of said last used postage amount.

7. A postage meter as described in claim 5 where said last used postage amount is saved in said meter.

8. A postage meter as described in claim 5 where the secure mechanism is debited before said digital indicium or said new digital indicium is downloaded to said printer.

9. In a postage metering device including a programmable controller, a secure mechanism for accounting for postage amounts expended, and a printing device, a method for printing digital postal indicia on mail pieces, said method comprising:
    responding, by said postage metering device, to presence of a mail piece to generate a digital indicium representative of a last used postage amount without debiting said secure mechanism for a postage amount corresponding to said digital indicium;

receiving, by said programmable controller, a signal representative of a determined postage amount for said mail piece;

determining, by said programmable controller, if said determined postage amount for said mail piece equals said last used postage amount;

if said postage amount determined for said mail piece equals said last used postage amount, said programmable controller, debiting said secure mechanism for the postage amount corresponding to said digital indicium and causing said printing device to print said digital indicium representative of said last used postage amount on said mail piece; and if said determined postage amount is not equal to said last used postage amount, said programmable controller deleting said digital indicium representative of said last used postage amount; causing a new digital indicium representative of said determined postage amount to be generated; debiting said secure mechanism for a postage amount corresponding to said new digital indicium, and causing said printing device to print said new digital indicium representative of said determined postage amount on said mail piece.

10. A method as described in claim 9 wherein said secure mechanism is debited before said digital indicium or said new digital indicium are downloaded for printing.

* * * * *